United States Patent [19]

Yang

[11] Patent Number: 5,015,928

[45] Date of Patent: May 14, 1991

[54] UNIVERSAL SERIES MOTOR WITH SPEED LIMITING CIRCUIT TO PROTECT THE MOTOR FROM OVERSPEEDING DURING RELATIVELY-SMALL LOADS

[76] Inventor: Tai-Her Yang, Giant Lion Know-How Co., Ltd., 6F-5, No. 250, Sec. 4, Chung Hsiao E. Road, Taipei, Taiwan

[21] Appl. No.: 527,511

[22] Filed: May 23, 1990

Related U.S. Application Data

[63] Continuation-in-part of Ser. No. 201,849, Jun. 3, 1988, abandoned.

[51] Int. Cl.$^5$ ............................................. H02K 23/00
[52] U.S. Cl. .................................... 318/250; 318/251; 388/806; 388/822; 388/905; 361/33; 361/56
[58] Field of Search ................ 318/246, 248, 249–252, 318/254; 388/801, 803, 806, 821–823, 826, 823, 905; 361/23, 33, 54, 56, 86

[56] References Cited

U.S. PATENT DOCUMENTS

| | | |
|---|---|---|
| 3,187,246 | 6/1965 | Garten .................................. 318/250 |
| 3,221,234 | 11/1965 | Ault ...................................... 318/250 |
| 3,590,352 | 6/1971 | Ries ................................. 318/251 X |
| 3,904,931 | 9/1975 | Leidich ................................. 361/56 |
| 4,023,071 | 5/1977 | Fussell ................................. 361/56 |
| 4,086,983 | 5/1978 | Anzai et al. ..................... 318/250 X |
| 4,131,832 | 12/1978 | Cavil et al. ..................... 318/251 X |
| 4,151,450 | 4/1979 | Fukuma et al. ................. 388/821 X |
| 4,213,077 | 7/1980 | Hernung et al. ................ 318/250 X |
| 4,594,632 | 6/1986 | Unnewehr ............................ 361/33 |
| 4,943,887 | 7/1990 | Bose ..................................... 361/56 |

Primary Examiner—William M. Shoop, Jr.
Assistant Examiner—David Martin
Attorney, Agent, or Firm—Leonard Bloom

[57] ABSTRACT

A shunt element and a voltage detection circuit are connected in parallel across the armature of a universal series motor. At relatively light loads on the motor, the armature speed increases, thereby increasing the back e.m.f. of the armature. The voltage detection circuit causes the shunt element to conduct, and a shunt current flows through the field of the motor, thereby increasing the field and limiting the speed of the motor. Various embodiments are disclosed.

7 Claims, 2 Drawing Sheets

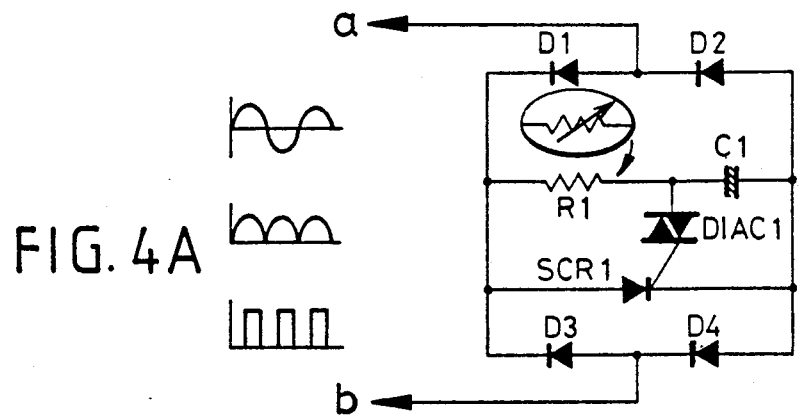
FIG. 4A
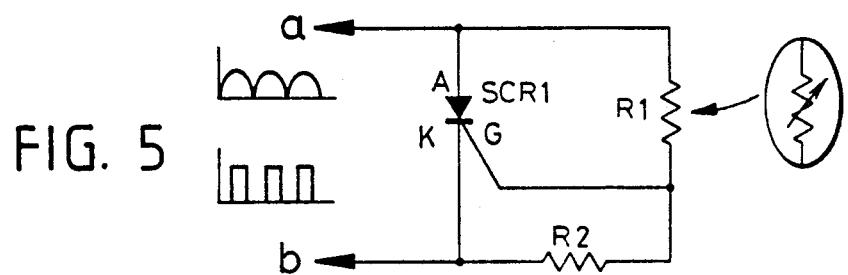
FIG. 5
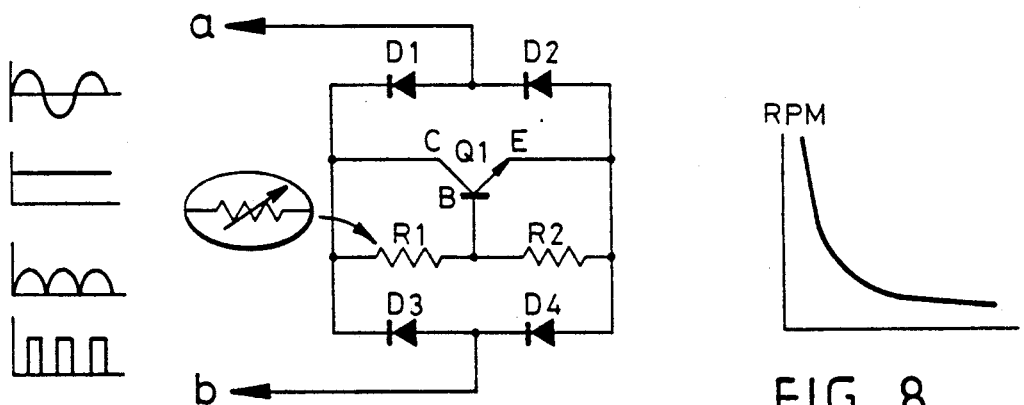
FIG. 6
FIG. 8
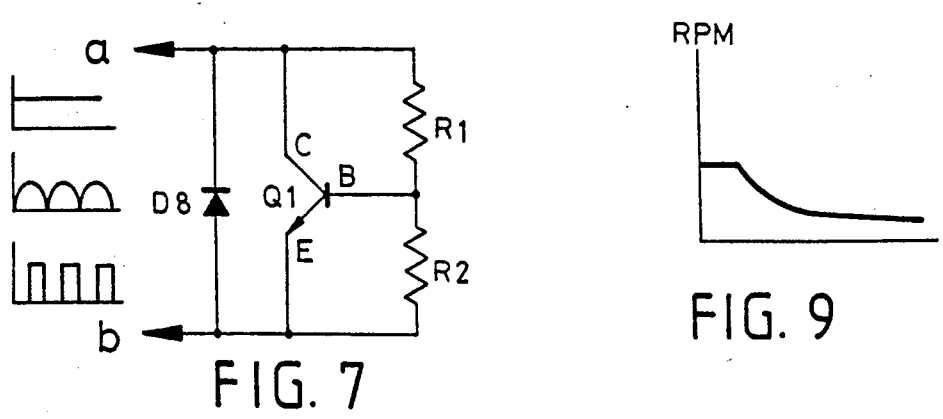
FIG. 7
FIG. 9

UNIVERSAL SERIES MOTOR WITH SPEED LIMITING CIRCUIT TO PROTECT THE MOTOR FROM OVERSPEEDING DURING RELATIVELY-SMALL LOADS

CROSS-REFERENCE TO RELATED APPLICATION

The present invention constitutes a continuation-in-part of U.S. application Ser. No. 201,849 filed June 3, 1988, the disclosure of which is incorporated herein in its entirety.

BACKGROUND OF THE INVENTION

Conventional universal series motors have been widely used to drive machinery in various types of industry and for various product applications, such as portable electric tools or small electrical appliances. However, a characteristic of those universal motors is that as the load is decreased, the speed or r.p.m. of the motor is increased. Accordingly, if an electric tool is not loaded during its operation, the motor r.p.m. will rise, thereby producing noise and accelerating the wear and failure rate of transmission elements driven by the motor, such as gears and bearings.

In U.S. Pat. No. 3,221,234 a Zener diode is used in series with a thermal resistance; as the thermal loss is relatively high, this design is suitable only for motors with relatively small power applications.

SUMMARY OF THE INVENTION

Accordingly, it is an object of the present invention to alleviate the deficiencies and disadvantages of the prior art by providing a universal series motor having a speed-limiting circuit, thereby protecting the motor from overspeeding under relatively small loads.

In accordance with the teachings of the present invention, a voltage limiting shunt element and armature voltage detection circuit are connected across the armature of a universal series motor. When the motor speed is rising due to small loading, the voltage across the armature will rise. When the armature voltage exceeds the conducting voltage of the voltage limiting shunt element, a shunt current will flow through the motor field, thereby intensifying the strength of the motor field and limiting the speed of the universal series motor, and thereby preventing high-speed noises and protecting the transmission element driven by the motor. When the voltage detection circuit includes a variable resistor, the proportional relationship between the electrical potential of the shunt element and the armature voltage can be adjusted to produce an adjustable armature highest-limit speed value, thereby providing a speed-controlling function.

Viewed in another aspect, the present invention provides a speed limiting circuit for protecting a universal series motor from overspeeding when the motor is lightly loaded. The motor has an armature and a field winding; the armature has first and second ends, and the field winding has first and second ends, respectively. The second end of the field winding is connected to the first end of the armature to form a series circuit. A source of power is provided for the motor, and this power source includes first and second conductors. The first conductor is connected to the first end of the field winding, and the second conductor is connected to the second end of the armature. A shunt element is connected in parallel with the armature, and this shunt element is connected from the junction between the second end of the field winding and the first end of the armature to the second end of the armature. The shunt element is normally non-conductive and is responsive to a control voltage input to become conductive whenever the control voltage input exceeds a pre-determined level. A voltage detection circuit is connected in parallel with the armature and with the shunt element. The voltage detection circuit has first and second input terminals and an output terminal, and the first input terminal of the voltage detection circuit is connected to the junction between the second end of the field winding and the first end of the armature. This voltage detection circuit produces a control voltage at the output terminal thereof which is proportional to the speed of the armature, and means are provided for applying the control voltage to the shunt element to control the conduction of the shunt element. As a result, the control voltage will rise to a value sufficient to render the shunt element conductive whenever the speed of the armature rises to a pre-determined value and current flow through the field winding is thereby increased, thereby tending to limit the speed of the armature to the pre-determined value.

In one embodiment, the voltage detection circuit embodies a first resistor and a second resistor connected in series. The junction between these first and second resistors constitutes the output terminal of the voltage detection circuit, and the ends of the first resistor and the second resistor opposite the output terminal, respectively, constitute the first and second input terminals of the voltage detection circuit.

Preferably, one of the first and second resistors is an adjustable resistor.

Where the power source is A.C., the shunt element may comprise a TRIAC; and where the power source is D.C., the shunt element may comprise an SCR.

These and other objects of the present invention will become apparent from a reading of the following specification, taken in conjunction with the enclosed drawings.

BRIEF DESCRIPTION OF THE DRAWINGS

FIG. 4A is a schematic diagram of a still further embodiment of the present invention utilized with A.C. power.

FIG. 5 is a schematic diagram of a still further embodiment of the present invention, wherein a silicon controlled rectifier is used as the shunt element.

FIG. 6 is a schematic diagram of a still further embodiment of the present invention, wherein a power transistor and bridge rectifier are used as the shunt element.

FIG. 7 is a schematic diagram of a still further embodiment of the present invention, wherein a power transistor is used as the shunt element.

FIG. 8 is a chart showing the speed characteristic of a conventional universal series motor.

FIG. 9 is a chart of the speed characteristic of a universal series motor, using the teachings of the present invention.

GENERAL DESCRIPTION OF THE PREFERRED EMBODIMENTS

Figure 1:
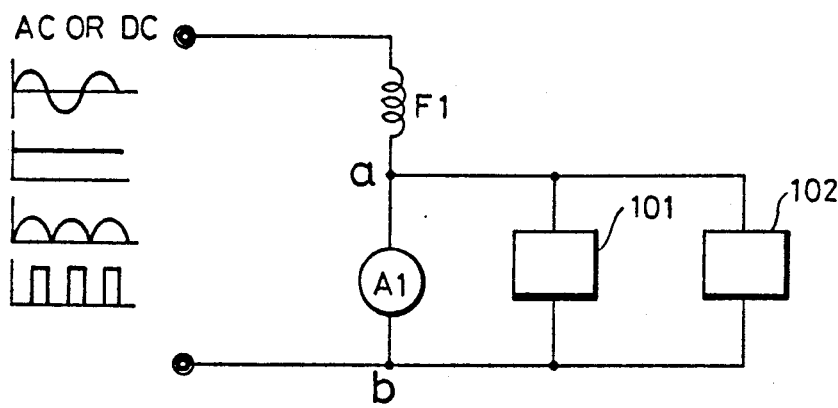
FIG. 1 is a schematic diagram of the circuit of the present invention, wherein the universal series motor may be driven by A.C., D.C. or pulsed D.C.

With reference to FIG. 1, a universal series motor has an armature A1 connected in series with a motor field F1 across a suitable source.

A power shunt element 101 is connected (across points a and b) in parallel with the motor armature A1. The type of shunt element 101 depends upon the type of power applied to the motor. For A.C., shunt element 101 may comprise a TRIAC or a bridge rectifier together with an SCR. For D.C., or pulsed D.C., shunt element 101 may comprise an SCR or a power transistor alone.

Figure 2:
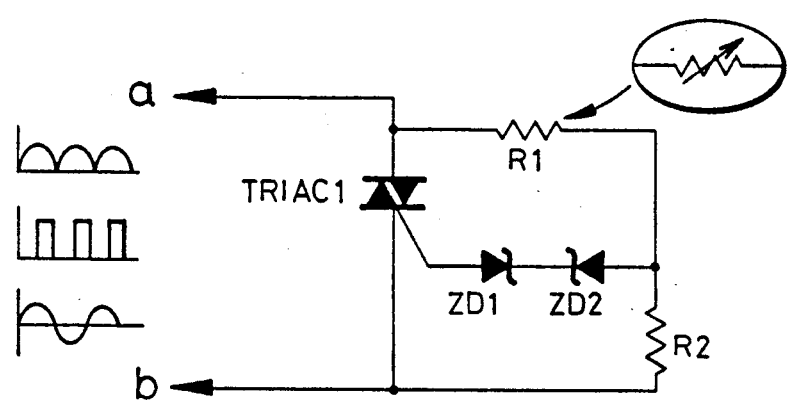
FIG. 2 is a schematic diagram of the shunt element and voltage detection circuit of the present invention, wherein a bidirectional insulated-gate thyristor ("TRIAC") is utilized as the shunt element.
Figure 3:
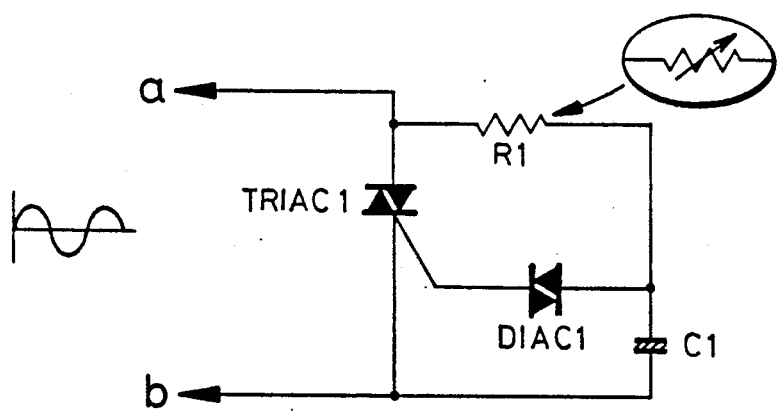
FIG. 3 is a schematic diagram of a further embodiment of the shunt element and voltage detection circuit.

A voltage detection circuit 102 is connected (across points a and b) in parallel with the motor armature A1 and shunt element 101. With reference to FIG. 2, voltage detection circuit 102 may comprise a voltage divider formed by series connected resistors R1 and R2 and Zener diodes ZD1 and ZD2. Resistor R1 may be made adjustable, thereby providing an adjustment of the limit speed of the motor. Alternatively, and as shown in FIG. 3, for A.C. power the voltage divider circuit 102 may be formed by an adjustable resistor R1, a capacitor C1, and a DIAC 1.

Shunt element 101 is normally non-conducting and has no effect at normal motor speeds. The back e.m.f. of the armature A1 is continuously sensed by the voltage detection circuit 102. When the motor speed rises to a critical value, the resultant increase in armature voltage is sensed by the voltage detection circuit 102 which triggers the shunt element 101 into conduction at a pre-set voltage. Conduction by the shunt element 101 increases the current through the motor field winding F1, thereby increasing the flux of the motor field, and thereby limiting the maximum speed of the motor armature A1.

FIGS. 2-7 illustrate various specific embodiments of the shunt element 101 and voltage detection circuit 102 which are used according to the type of power supplied to the motor.

FIG. 2 illustrates an embodiment of the invention suitable for use with A.C., D.C. or pulsed D.C. power. In this embodiment, the shunt element 101 comprises a TRIAC 1, and the voltage detection circuit 102 comprises a voltage divider R1 and R2 together with back-to-back connected Zener diodes ZD1 and ZD2. As is known, TRIAC 1 will conduct bi-laterally whenever the voltage applied to the gate thereof is sufficient to trigger the TRIAC 1 into conduction. Zener diodes ZD1 and ZD2 block application of a voltage to the gate of the TRIAC 1 until the voltage across the motor armature A1 becomes sufficient to raise the voltage at the junction of resistors R1 and R2 to the Zener voltage of ZD1 and ZD2. At that point, ZD1 and ZD2 will conduct bi-laterally to apply a gate voltage to TRIAC 1, rendering the latter conductive, increasing the current through the motor field winding F1 and limiting the motor speed. By adjustment of resistor R1, the voltage at the junction of resistors R1 and R2 may be adjusted proportionately so that the limit speed of the motor may be adjusted. The bi-lateral conduction characteristics of both TRIAC 1 and Zener diodes ZD1 and ZD2 make the embodiment of FIG. 2 useful for either A.C., D.C. or pulsed D.C. power sources for the motor.

FIG. 3 shows an embodiment of the invention useful only for A.C. power sources for the motor. The embodiment of FIG. 3 is similar to that of FIG. 2 except that resistor R2 of FIG. 2 is replaced by a capacitor C1 in FIG. 3. For A.C. power, R1 and C1 function similar to R1 and R2, respectively, to divide the armature voltage down to the desired value at which ZD 1 and ZD 2 conduct. If the power source is D.C., however, capacitor C1 charges to a fixed value and R1–C1 no longer functions as a voltage divider.

Figure 4:
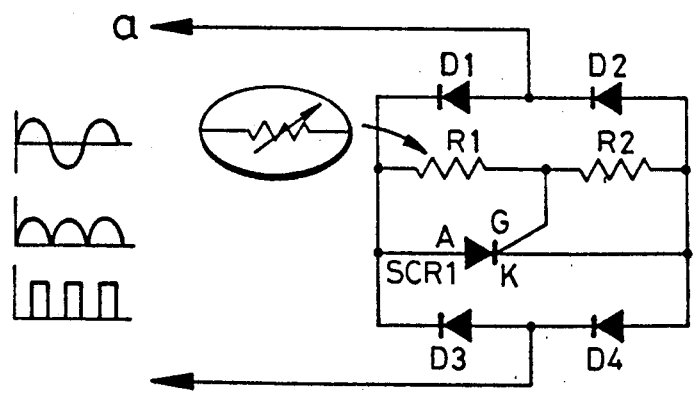
FIG. 4 is a schematic diagram of a still further embodiment of the shunt element and voltage detection circuit, using a bridge rectifier and silicon controlled rectifier.

FIG. 4 shows an embodiment of the invention useful for A.C., D.C. or pulsed D.C. motor power sources. In this embodiment, a full-wave rectifier bridge comprising diodes D1, D2, D3 and D4 is connected across points a and b. A voltage divider comprising resistors R1 and R2 is connected between the junction point of diodes D1 and D3 and the junction point of diodes D2 and D4. The anode A of SCR1 is connected to the junction point of diodes D1 and D3, and the cathode K of SCR1 is connected to the junction point of diodes D2 and D4. The gate G of SCR1 is connected to the junction point of resistors R1 and R2. Whether the polarity of the voltage at point a is positive or negative with respect to point b, the polarity of the voltage at the junction of diodes D1 and D3 is always positive with respect to point b. Therefore, SCR1 will conduct whenever the voltage at the junction of R1 and R2 rises to a value sufficient to trigger SCR1 into conduction, regardless of whether the voltage across points a and b is A.C. or D.C.

The embodiment of FIG. 4A is similar to that of FIG. 4, except that resistor R2 has been replaced by a capacitor C1, and DIAC 1 has been inserted in the gate circuit of SCR1.

FIG. 5 shows an embodiment of the invention suitable for use only with a D.C. or pulsed D.C. motor power source. Shunt element 101 comprises SCR1; and voltage detection circuit 102 comprises a voltage divider including a resistor R1 (which may be adjustable) connected in series across points a and b. The anode A of SCR1 is connected to point a, and the cathode K of SCR1 is connected to point b. The gate G of SCR1 is connected to the junction point of resistors R1 and R2. SCR1 will conduct only when the voltage at point a is positive with respect to point b and when the motor speed has reached a sufficient value that the voltage at the junction of resistors R1 and R2 is adequate to trigger SCR1 into conduction.

FIG. 6 shows an embodiment of the invention similar to that of FIG. 4, except that here the shunt element 101 comprises a power transistor Q1, instead of an SCR. The embodiment of FIG. 6 is useful for either A.C., D.C. or pulsed D.C. motor power sources.

FIG. 7 shows an embodiment of the invention similar to that of FIG. 5, except that here shunt element 101 comprises a power transistor Q1, instead of an SCR. As in the embodiment of FIG. 4, the embodiment of FIG. 5 is useful only with D.C. or pulsed D.C. motor power sources. D8 is a protective diode connected across points a and b to protect Q1 from damage by inverse polarity voltage.

FIG. 8 is a speed versus torque curve for a conventional universal series motor without the speed limiting control of the present invention. At higher motor loads and higher torque output of the motor, the motor speed remains at a relatively low, substantially constant value. As the motor load and torque output of the motor decreases, however, the motor speed increases greatly and may reach a destructive value.

FIG. 9 is a speed versus torque curve for a universal series motor which includes the protective speed limiting control of the present invention. At higher motor loads and motor torque outputs, the speed versus torque characteristic of the protected motor is identical to the speed versus torque characteristic of an unprotected motor. At lower motor loads and lower motor torque output, the speed of the protected motor increases until the motor armature voltage reaches the point at which the speed limiting circuit of the present invention becomes operative. Any further reduction in motor load or motor torque output does not result in a corresponding increase in motor speed, and the motor speed remains constant at all lower values or torque and within a safe operating range for the motor.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A speed limiting circuit for protecting a universal series motor from overspeeding when the motor is lightly loaded, comprising a motor having an armature and a field winding, said armature having first and second ends and said field winding have first and second ends, said second end of said field winding being connected to said first end of said armature to form a series circuit, a source of power for said motor, said power source including first and second conductors, said first conductor being connected to said first end of said field winding, said second conductor being connected to said second end of said armature, a shunt element connected in parallel with said armature, said shunt element being connected from the junction between said second end of said field winding and said first end of said armature to said second end of said armature, said shunt element being normally non-conductive and being responsive to a control voltage input to become conductive whenever said control voltage input exceeds a pre-determined level, a voltage detection circuit connected in parallel with said armature and with said shunt element, said voltage detection circuit having first and second input terminals and an output terminal, said first input terminal of said voltage detection circuit being connected to the junction between said second end of said field winding and said first end of said armature, said voltage detection circuit producing a control voltage at said output terminal thereof proportional to the speed of said armature, and means for applying said control voltage to said shunt element to control the conduction of said shunt element, whereby said control voltage will rise to a value sufficient to render said shunt element conductive whenever the speed of said armature rises to a pre-determined value and current flow through said field winding is thereby increased, thereby tending to limit the speed of said armature to said pre-determined value.

2. A speed limiting circuit as claimed in claim 1, wherein said voltage detection circuit comprises a first resistor, a second resistor, said first and second resistors being connected in series and having a junction therebetween, wherein the junction comprises said output terminal of said voltage detection circuit, and said first and second resistors having respective ends opposite said output terminal, wherein said respective ends comprise said first and second input terminals of said voltage detection circuit.

3. A speed limiting circuit as claimed in claim 1, wherein one of said first and second resistors comprises an adjustable resistor.

4. A speed limiting circuit as claimed in claim 1, wherein said source of power supplies A.C. power for said motor, and wherein said shunt element comprises a TRIAC.

5. A speed limiting circuit as claimed in claim 1, wherein said course of power supplies D.C. power for said motor, and wherein said shunt element comprises an SCR.

6. A speed limiting circuit as claimed in claim 1, further including a full-wave bridge rectifier having first and second input terminals, and further having first and second output terminals, said first input terminal of said bridge being connected to said first end of said armature, said second input terminal of said bridge being connected to said second end of said armature, said first input terminal of said voltage detection circuit being connected to said first output terminal of said bridge, said second input terminal of said voltage detection circuit being connected to said second output terminal of said bridge, and said shunt element being connected between said first and second output terminals of said bridge.

7. A speed limiting circuit as claimed in claim 6, wherein said shunt element comprises an SCR.

* * * * *